April 11, 1939.  A. PARKS  2,154,109
DISPLAY DEVICE
Filed Jan. 17, 1938  3 Sheets-Sheet 1
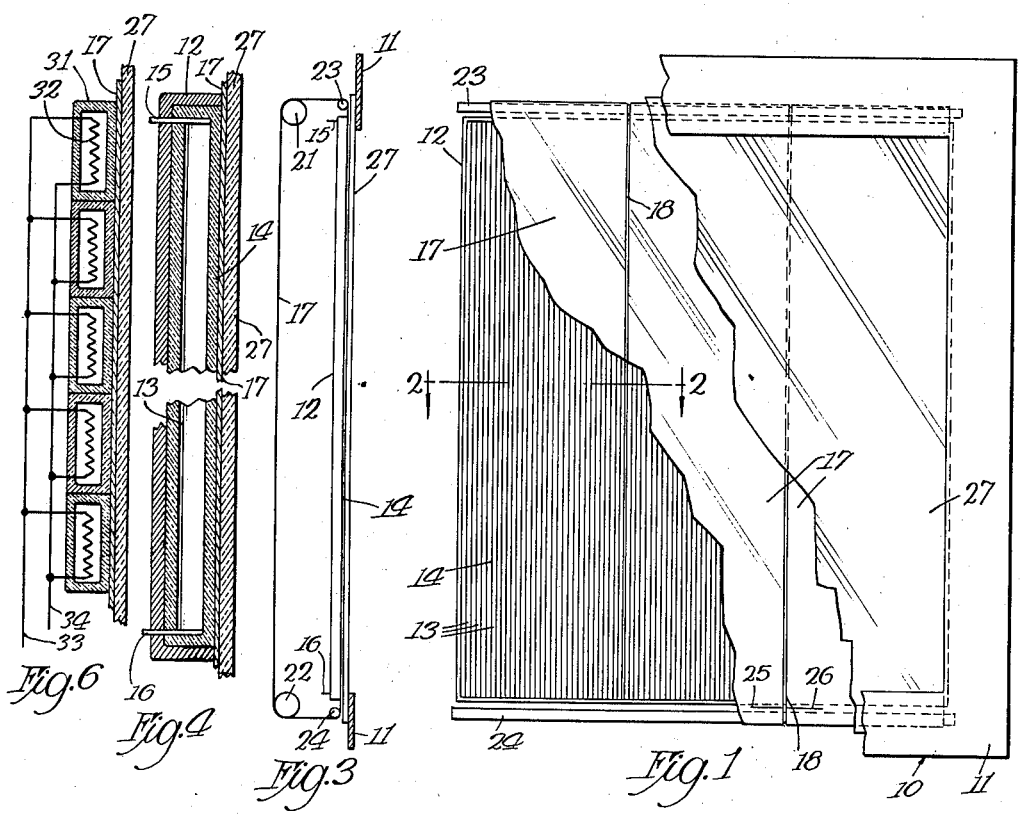
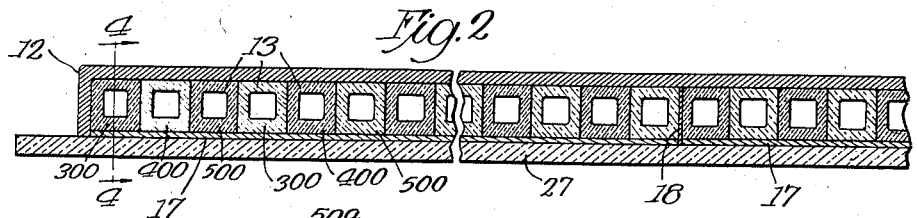
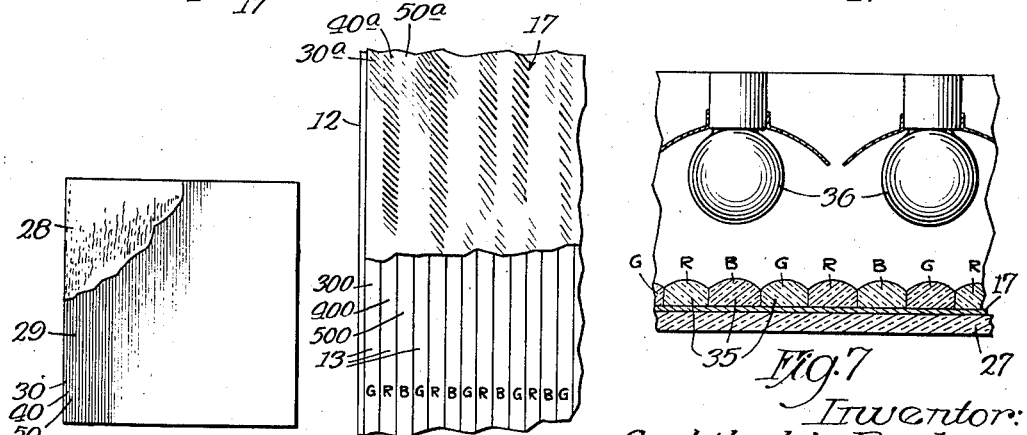
Inventor:
Archibald Parks
By Gillson, Mann & Co.
Attys.

April 11, 1939.  A. PARKS  2,154,109
DISPLAY DEVICE
Filed Jan. 17, 1938  3 Sheets-Sheet 2

Inventor
Archibald Parks

April 11, 1939.  A. PARKS  2,154,109
DISPLAY DEVICE
Filed Jan. 17, 1938   3 Sheets-Sheet 3
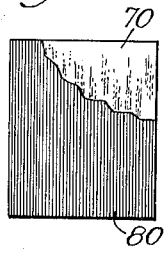
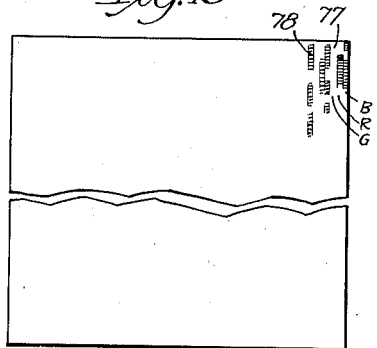
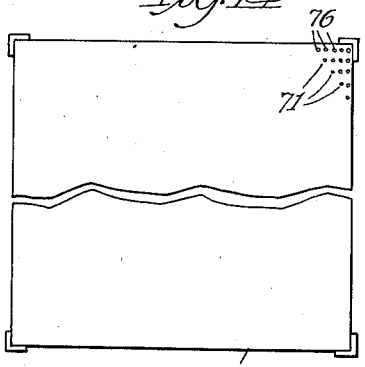
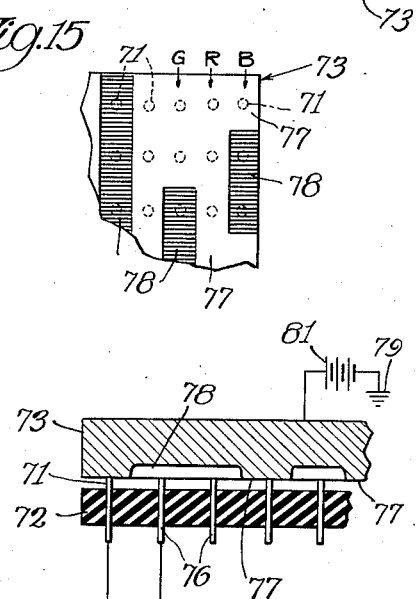
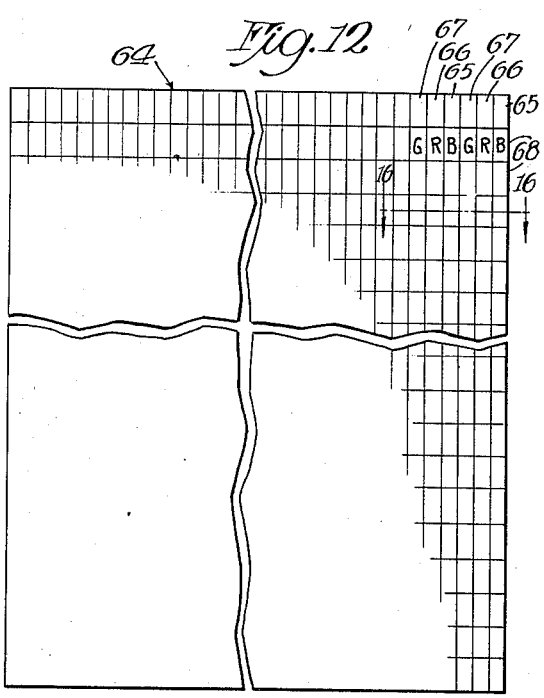
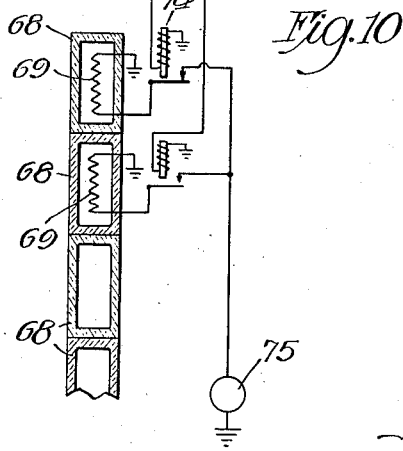
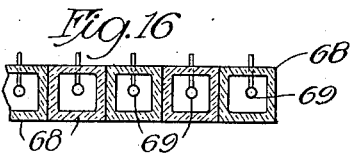
Inventor:
Archibald Parks
By Gibson, Mann &Co
Attys.

Patented Apr. 11, 1939

2,154,109

UNITED STATES PATENT OFFICE 2,154,109

DISPLAY DEVICE

Archibald Parks, Chicago, Ill.

Application January 17, 1938, Serial No. 185,313

16 Claims. (Cl. 40—132)

This invention relates to advertising devices and more particularly to illuminated display devices.

One of the objects of the invention is the provision of a new and improved display device having novel means for displaying attractive scenes in natural colors.

Another object of the invention is the provision of a new and improved display board having novel means of illumination.

A further object of the invention is the provision of a new and improved display device having novel means for producing in colors reproductions of actual scenes and objects.

Another object of the invention is the provision of a new and improved method of depicting articles of merchandise and other scenes on screens or billboards in their natural tints, shades and colors.

A further object of the invention is the provision of a new and improved billboard or display board having novel means for displaying the design in colors together with novel means for changing the design when it is desired.

Another object of the invention is the provision of new and improved means for displaying designs or advertising illustrations in natural colors, that is effective and efficient in use, faithful in representation of tints, shades and colors, and a construction in which the display or design may be changed at will at a nominal expense.

Other and further objects and advantages of the invention will appear from the following description taken in connection with the accompanying drawings in which—

Fig. 1 is a front elevation of the display device, with parts broken away and parts omitted for the sake of clearness;

Fig. 2 is a section on the line 2—2 of Fig. 1 on an enlarged scale;

Fig. 3 is an end elevation of the device shown in Fig. 1 but showning the frame in section;

Fig. 4 is a section on the line 4—4 of Fig. 2;

Fig. 5 is a front elevation of the display device on an enlarged scale, with parts broken away;

Fig. 6 is a view similar to Fig. 4 but showing a modified form of construction;

Fig. 7 is a top plan view of a further modified form of construction;

Fig. 8 is a front elevation of a color screen or filter and a sensitized plate or film assembled and ready for exposure;

Fig. 10 is a diagrammatic view of a still further modified form of construction, showing parts in section;

Fig. 11 is a front elevation of a color screen and a negative employed in preparing a control board for use in the structure employed in the form of construction shown in Fig. 10;

Fig. 12 is a front elevation of the screen or large display board shown in Fig. 10 on which the design is depicted;

Fig. 13 is an elevation of the control board;

Fig. 14 is a front elevation of the switchboard;

Fig. 15 is an elevation of a portion of the control board shown in Fig. 10 but on an enlarged scale; and Fig. 16 is a section on the line 16—16 of Fig. 12.

Figure 9:
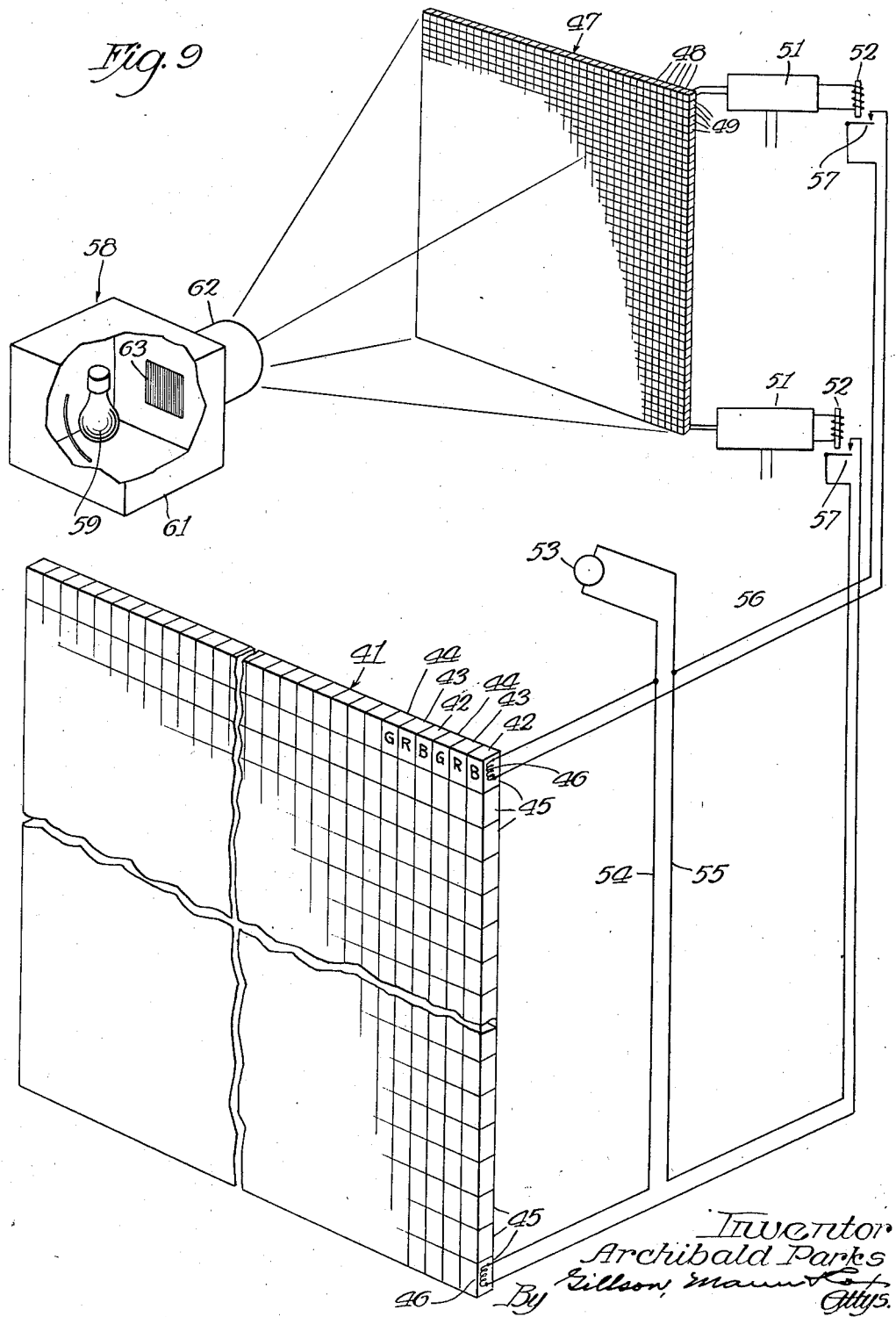
Fig. 9 is a diagrammatic view of a modified form of construction.

In the construction of large illuminated display boards, an enormous amount of time and expense is involved in the installation of the same, especially in the larger types in which the design is outlined by electric light bulbs. In such display boards, it costs almost as much as the original installation to change the design. Furthermore, no attempt has been made to make an exact representation of the natural tints, shades and colors of the objects attempted to be reproduced. More or less color appears but this is only a rough attempt to produce the design in contrasting colors as evidenced by the numerous colored signs appearing in front of business houses on the street during the night time.

The present invention seeks to remedy these defects by the provision of means whereby the design will be presented in colors faithfully and substantially accurately depicted and with mechanism so constructed that the designs may be changed at will with a nominal amount of time and expense.

Referring now to the drawings, the reference character 10 designates a display device comprising a frame 11, a receptacle 12 in the rear of the frame and containing a plurality of light tubes or tubular lamps 13. The tubes may be straight, curved, zig-zag, or of any desired shape.

In the form shown, which is by way of example only, the tubes are straight and extend the full height of the display device and are arranged continguously to each other to form what may be termed a display board or screen 14. These tubes have their front faces transparent and their sides opaque. The opaque receptacle 12 extends across the back. The tubes may be of glass having the sides painted black, or, if desired, the tubes may be separated by thin, opaque partitions which will prevent intermingling of the light in the same manner as the painted sides. The tubes are adapted to contain a gas, such as neon gas and the like, that may be energized by an electric current. This gas is of such a nature, or the tubes so colored, or both, that when the tubes are energized, they will emit light of complementary colors.

The tubes are arranged in periods or groups which are contiguous and continuous across the front of the receptacle 12 and constitute the screen or display board 14. Each period or group contains tubes emitting light of complementary colors. If only two colors or tubes are employed, red and greenish blue may be used. In the form of the construction selected to illustrate one embodiment of the invention, each period or group contains three colors—green, red and blue or violet, which follow each other in regular sequence across the screen. Each of these tubes is provided with electrical terminals 15 and 16 at the ends thereof whereby the tubes may be electrically energized in the usual manner.

The display design or reproduction is contained on a positive film 17 which is mounted in the front of and contiguous to the board 14. Since commercial films are limited in width, usually not over 42 inches, it is necessary in outdoor advertising where the screen is of extensive area to make the film in a plurality of sections. Where the film is in sections, guide strips 18 are provided on the board to guide the edge of the film section so that it may be made to register with the adjacent film sections and also insure registration of the color strips on the screen and corresponding tubes, as will presently be explained. As shown, these guide strips 18 extend vertically and are arranged between two adjacent tubes as seen more clearly in Figs. 1 and 2 of the drawings.

The positive films 17 are so connected that each section forms an endless film and, if desired, a plurality of designs may be on the same film. During the daytime these designs will be visible without the use of electric illumination behind the same. If desired, some of the designs on the screen 17, shown in Fig. 3, may be merely painted or printed on the film and serve as a design for daytime advertising only. The film shown in Fig. 1 is only long enough for two designs but by lengthening the screen, any desired number may be employed. As shown, a positive of one design may be on the front run of the film and of another design on the back run thereof whereby when it is desired, the design may be changed by rotating the films. The films are trained around the rollers 21 and 22 and extend over the guide rollers 23 and 24 at the upper and lower edges of the screen 14 which guide the films over the face of the screen, as is more clearly shown in Fig. 3 of the drawings. When it is desired to change the design, the rollers 21 and 22 are rotated to bring the design on the rear runs of the films in front of the screen 14. The adjacent films may be marked with lines 25 and 26 which, when brought in register, will insure that the films are in the proper matching position to display the complete design.

A cover plate 27 of any suitable transparency, such as Celluloid, glass, or the like, is mounted over the front of the screen 14 and contacts the forward edges of the guide strip 18, thereby forming channels for containing the positive films and through which they may be moved when it is desired to change the display design.

In order that the display design or reproduction shall be shown in colors, the film 17 is prepared in a manner that will now be described. Photographic reproductions of the object to be displayed are first made. In making these photographs, the sensitized negative plate or film 28, Fig. 8, is exposed to light passing through what may be called a color filter 29 and the impression obtained on this negative may, for convenience of description, be termed a lined color filter negative. The color filter 29 is provided on its face with a plurality of colored strips or colored lines 30, 40 and 50 arranged in groups of a predetermined order. These lines may vary in number from 200 to 900 to the inch and the colors employed are complementary. If two colors alone are used, they may be red and greenish blue and are arranged alternately across the filter. In the form of the construction shown, however, each group comprises three colors, green, red and blue, 30, 40 and 50 respectively, Fig. 8. The groups are contiguous and are so arranged that the lines are continuous across the filter.

In making the exposure, the color filter is placed in front of the sensitized films or plate 28 within the photographing apparatus, and after exposure, an enlarged positive film 17, which for convenience of description will be termed a lined color filter positive, Fig. 5, is made. The enlargement is such that the lines 30a, 40a and 50a, Fig. 5, impressed by the color screen, will be of the same width as the corresponding color tubes 300, 400 and 500, respectively, and will register therewith. For instance, the bands 30a, 40a and 50a, corresponding to the green, red and blue lines 30, 40 and 50 of the color filter, will register with the corresponding color tubes 300, 400 and 500, respectively. The different colors are indicated by letters G, R and B in Figs. 5 and 7 and extend throughout the height and width of the screen so that when the tubes are energized, the film will depict the display design in colors. The color lines or bands may be placed on the color filter 29 in any suitable manner, such, for instance, as that disclosed in the patent to Powrie, 1,605,062, November 2, 1926.

The form of construction shown in Fig. 6 differs from that just described in that each of the colored tubes are divided into a plurality of sections 31. These sections may be energized in the same manner as already described or they may be energized by filaments 32 similar to filaments in lamp bulbs. The filaments of the tubes 31 are connected in parallel to the electric leads 33 and 34. Since the remainder of the construction and operation is substantially the same as that already described, it is not thought necessary to repeat the same at this time.

Instead of employing tubes that may be energized, colored glass bars such as those shown at 35 in Fig. 7 may be employed. These bars are arranged in groups and each group is provided with bars of complementary colors, that is, where three colors are employed, the first bar of each group may be green, the second red and the third blue, in the same manner as the tubes shown in Fig. 1. These bars are of glass or some other suitable transparent material and light is caused to pass through the same by a suitable number of sources of light 36 mounted at the rear of the bars. The adjacent sides of the bars may be rendered opaque in any suitable manner or opaque strips may be inserted between them as described above. The positive film 17 containing the display design is mounted in front of the screen in the same manner as already described.

In the form of construction shown in Fig. 9, an illuminated design is presented on the display board by a selection of rays of light of the primary colors as in the previous construction but the means for actuating the sources of those colored lights is different. In this construction the tubes on the display board are selectively energized by the aid of light sensitive cells. These cells are selectively energized by light rays projected through a negative film made by the aid of a color filter in the manner already described.

The display board 41 is similar to the board shown in Fig. 6. The board is composed of a series of columns of different colored tubes or tubes or other members capable of emitting the primary colors. As shown, there are sets or groups of these tubes arranged contiguous to each other and continuous across the board. As shown, the groups each consist of the three primary colors, blue, red and green as shown at 42, 43 and 44 and are continued across the face of the screen. Each tube extends entirely across the board from top to bottom. As shown, each column is made up of a plurality of units 45, each unit being provided with means such as the filament 46 for energizing the units independently of each other. The tubes of the units may contain the proper gas so that when it is energized, the unit will emit the desired color as in the previous construction.

A control board 47, which in practice is much smaller than the display board, is provided for controlling the energizing of the units 42, 43 and 44 on the display board. This control board has a plurality of columns of tubes 48, each of which is divided into a plurality of sections or cells 49. The number of columns and cells correspond to the columns and units, respectively, of the display board. Each cell 49 is a photo-electric or light sensitive cell and controls the energizing of the corresponding unit on the display board. As shown diagrammatically in Fig. 9, each cell 49 contains a light sensitive device and when exposed to light, a current passes into the amplifier 51 which amplifies the current in the usual manner and this amplified current is sufficient to operate a relay 52 which in turn closes a circuit through the corresponding unit in the display board and energizes the unit. Only two cells are shown as being connected to their corresponding units but it is understood that each cell is likewise connected to its corresponding unit. Since the light sensitive cell arrangement, including the amplifying arrangement and relay, are of any conventional structure using either the selenium cell or the "electric eye" or "phototube", it is not thought necessary to describe the same more in detail.

A generator 53 supplies current to energize the filaments 46 of the different units. The leads 54 and 55 have the units connected to them in parallel and each circuit 56 through the unit is closed by its corresponding relay at 57 as shown in Fig. 9. When the cells 49 are energized by light waves falling on the same, the relay 52 is operated to close the circuit through the corresponding unit or filament 46.

The cells 49 of the control board 47 are energized by rays of light falling on the same that are projected thereon by a light projector 58. The projector is of the usual construction and comprises a source of light as the tube or bulb 59 mounted in a casing 61 having a light projector tube 62 which is provided with lenses for enlarging the image, as is usual in such constructions. A slide containing the image or design to be projected is shown at 63. This slide is a positive made from a negative which in turn is exposed through a color filter or screen the same as that shown at 29 in Fig. 8.

The control board 47 is of such dimensions as to be co-extensive with the projected image. The cells 49 will be exposed to the light projected by the projector 58 and where the rays of light passing through different parts of the plate 63 are intense enough, the cells will be energized and the current passing from the cell, being amplified, will operate the relay 57 to close the circuit 56 through the filaments 46 of the corresponding units on the display board. It will thus be seen that where the rays of light are sufficiently intense, they will energize the cells on the control board and this in turn will close the circuit in the corresponding units in the display board whereby these energized units will outline the design in colors on the display board.

It will thus be seen that in order to change the design on the display board 41, it is only necessary to change the slide 63. This is considered an important feature of the invention because at the present time, in illuminated display boards, a single design on some of the larger boards will cost thousands of dollars to install and it will cost almost as much to change the design. With this construction, practically the only cost in changing the design after the board is once constructed will be the cost of producing the slide.

In Figs. 10 to 16 is shown another modified form of construction. In this form of the device, the sign or display board 64 is constructed like the board shown in Figs. 6 and 9 but different means are employed for energizing the units. In this form of construction, the light bands—blue, red and green, 65, 66 and 67—are arranged in tubular columns as in the previous construction. The columns are arranged in groups which are continuous across the face of the screen as previously described. Each column is provided with a plurality of sections or units 68, which, in the form of the construction shown, are adapted to be energized by filaments 69. As in the previous construction, these units may contain a suitable gas instead of the filaments 69.

The units 68 are adapted to be energized by the closing of a circuit through contact members 71 carried by a switchboard 72. The contact or switch members 71 are contacted by a control board 73 for closing circuits through said members, as will presently appear. The closing of the circuits through the contact members 71 will operate relays 74, grounded in the usual manner, which in turn will close circuits through the filaments 69. The current for energizing the filaments 69 is produced by a generator 75, grounded in the usual manner, see Fig. 10. There is a contact or switch member 71 for each unit and these switches, as shown in Fig. 10, comprise fingers 76 which are rigidly mounted in the switchboard 72. There is a switch member 71 for each unit 68 and the design to be produced in relief on the control board 73 will be outlined by the colored tubes, bulbs or units 68 that are energized, as will now be described.

The control board 73 is of metal as copper or like conductor and has etched on it the corresponding design of the negative. The negative is made by exposing a sensitized plate or film 70 through a color screen 80, which is similar to the color screen 29, in the manner already described. The parts in relief 77 on the plate 73 will outline the figure while the depressions 78 will be of such depth that when the control board is placed in proper position on the switchboard 73, the switch fingers 76 opposite the depressions will not close the circuit through the corresponding filaments 69 while those contacting the raised portions on the control board will close circuits through the relays for energizing the corresponding units 68.

The switch and control boards are of the same size and are much smaller than the display board and larger than the original negative but the parts are in proportion to those of both the original negative and the display board so that in use the proper units 68 will be energized.

The control board is secured in position on the face of the switchboard in any suitable manner and is held in perfect registration with the switchboard. The fingers 76 are of conducting material and extend through the switchboard 72 which is of non-conducting material, or, if desired, the board is of any desired material and the fingers 76 insulated therefrom. Each finger is in circuit with its corresponding relay 74 and when the finger is contacted by the raised portion of the control board, the circuit is closed through the relay 74 and this will in turn close a circuit from the generator 75, or other source of current, through the corresponding unit 65 or filament 69.

The current for operating the relay may be produced by a suitable source such as the battery 81 grounded as at 79.

In this form of construction, it is only necessary to change the control board in order to produce a different design on the display board. Such an arrangement very materially reduces the cost of changing the design.

While the color tubes and units of the display board are shown as being arranged in straight lines or rows, it is understood that they may be otherwise arranged as for instance, in concentric circles, herringbone form and the like, but since the films, and plates must be registered accurately, the straight line arrangement is to be preferred as it takes less time and effort to properly align the parts.

It is thought from the foregoing, taken in connection with the accompanying drawings, that the construction and operation of my device will be apparent to those skilled in the art and that changes in size, shape, proportions and details of construction may be made without departing from the spirit and scope of the appended claims.

I claim as my invention:

1. A display device comprising a plurality of light tubes relatively small in cross-section and arranged in a common plane in contact with each other, each tubular member having its forward portion transparent, means for continuously electrically energizing said tubes for constituting sources of light, and means for causing said tubes to radiate rays of light of the primary colors, each tube emitting light of only one primary color.

2. A display screen comprising a series of small tubes arranged in a plurality of contiguous groups in a common plane, the front portions only of said tubes being transparent, means within said tubes for continuously energizing the same by electric currents during use, each of said groups comprising three tubes each adapted to project only rays of light of one of the primary colors different from the remaining two, said tubes being arranged in the same order in all the groups throughout the series.

3. In a display device, a plurality of groups of containers arranged contiguous to each other in a common plane, each group comprising one container for each of the primary colors arranged in the same order in all groups, means within said containers for continuously energizing and illuminating the same for causing them to project continuously rays of light of the primary colors, while in operation.

4. A display device comprising a screen composed of a plurality of tubes arranged in contiguous groups, each group consisting of tubes emitting rays of light of complementary colors, means for energizing said tubes, and a lined color filter positive film extending over the face of said screen, said positive being enlarged so that the photographed color lines will register with the corresponding tubes of said screen.

5. In a display device, a display board having a plurality of narrow tubes continuous across the face of the board and contiguously arranged in a common plane, said tubes being arranged in groups, means for continuously energizing said tubes for representing three primary colors uniformly arranged, and mechanism including means having the properties of an element that has been derived from a negative taken through a color filter having fine color bands corresponding to said tubes and their arrangement for causing a predetermined design to appear in colors on the face of said display board.

6. In a display device, a display board comprising a plurality of light transmitting members arranged in groups of a plurality of members continuously across the face of the display board and each group being adapted to be illuminated to emit rays of light of primary colors arranged in regular order, means for illuminating said members, and a lined color filter positive through which said rays pass to depict an image in natural colors.

7. In a display device, a display board having a plurality of narrow tubes continuous across the face of the board, said tubes being arranged in groups, means for continuously energizing the tubes of each group to cause them to emit rays of the three primary colors uniformly arranged, and means including a lined color filter positive having its photographed color lines registering with the corresponding color tubes throughout the entire area of said board for causing the design on said positive to appear in colors.

8. In a display device, a display board comprising a plurality of tubes arranged in groups contiguous and continuous across the board, each group comprising three tubes representing three primary colors, a film in front of said tubes contiguous to the front face thereof, said film comprising a positive having the properties of a film that had been made from a negative exposed through a color filter having color bands corresponding to the tubes of said board.

9. A display board comprising a plurality of light projecting elements arranged in groups of three continuous across the board, each group being capable when energized of projecting rays of light of three primary colors, a positive film in front of said board, a transparent front wall in front of said film, and a roller above and one below said board for holding said film between said board and said front wall, said film registering with said tubes whereby the design on said positive film will be depicted in colors on said film.

10. A method of displaying a design which comprises positioning an enlarged photo-positive, made from a photo-negative that has been exposed to light through a color screen having fine color lines thereon of the primary colors continuous across the face of the screen over the face of a display board, constructed of color tubes of the primary colors continuous across the board and of the same dimensions as the enlarged color bands on the positive so that the color bands of the board register with those of the positive, and then energize the tubes for projecting light rays through the positive.

11. In combination, a display board comprising a plurality of tubes arranged in groups across the face of the board, each group consisting of rows of tubes for producing light rays of the primary colors, each tube comprising a plurality of units adapted to be energized, a control board comprising a metal plate having etched thereon the design to be displayed on said display board, and a switchboard having electrical contact fingers, one for each unit, for completing continuous circuits through the units corresponding to the contact members engaged by the raised portions on said control board, whereby the design on said control board will be reproduced in colors on said display board.

12. In a display device, a display board comprising a plurality of groups of energizable light units extending continuously across the board, each group comprising units of only three primary colors, a control board having a plurality of photo-sensitive cells corresponding to the number and arrangement of said units on the display board and each cell capable of energizing its corresponding unit, and means including a source of light having its rays projected through a lined color filter positive for projecting an image of the design on said control board for energizing certain of said cells for energizing the corresponding units for depicting said design on said display board.

13. In a display device, a display board comprising groups of tubes arranged in columns across the face of the display board, each group comprising tubes capable of emitting rays of the three primary colors, a positive film containing the design across the face of said board, said positive having the properties of a film that had been derived from a negative exposed to light reflected from an object through a color filter containing color bands of the three primary colors, and means for energizing said tubes for depicting the design in natural colors on the screen.

14. In a display device, a display board comprising a plurality of colored light emitting members arranged in groups, each group having members emitting not more than three separate colors, arranged in a predetermined order, and means including a lined color filter photographic film for cooperating with said members for causing the rays of light from said members to depict in colors the image on said film.

15. The method of exhibiting designs in colors on a display board having tubes of complementary colors which comprises making a developed lined color filter photographic film, enlarging said film so that the lines thereon correspond to said tubes, securing said enlarged film in front of said board with the lines on the film in front of the corresponding tubes, and then energizing said tubes to cause the same to emit colored light.

16. A display board comprising a plurality of light emitting members in a plane to form the face of said board, said members being in contact throughout the entire area of the board, said members emitting rays of light of complementary colors occurring at regular intervals throughout the entire area of the board, and means for causing said members to emit such rays continuously during the operation of the board.

ARCHIBALD PARKS.